United States Patent [19]

Arai et al.

[11] Patent Number: 4,733,247

[45] Date of Patent: Mar. 22, 1988

[54] INK JET RECORDING METHOD IN WHICH THE PROJECTED INK DROPLETS HAVE A WEBER NUMBER OF NO MORE THAN 500

[75] Inventors: Ryuichi Arai, Sagamihara; Mamoru Sakaki, Atsugi, both of Japan

[73] Assignee: Canon Kabushiki Kaisha, Tokyo, Japan

[21] Appl. No.: 875,304

[22] Filed: Jun. 17, 1986

[30] Foreign Application Priority Data

Jun. 18, 1985 [JP] Japan .............................. 60-130701

[51] Int. Cl.$^4$ ...................... G01D 15/16; G01D 15/34

[52] U.S. Cl. ...................................... 346/1.1; 346/75; 346/135.1; 346/140 R

[58] Field of Search ................ 346/1.1, 140, 75, 135.1

[56] References Cited

U.S. PATENT DOCUMENTS 4,399,443 8/1983 Yasufuku ............................ 346/1.1

4,542,059 9/1985 Toganoh ...................... 346/135.1 X 4,664,952 5/1987 Arai ................................ 346/1.1 X

OTHER PUBLICATIONS

Curry et al.; Scale Model of an Ink Jet, IBM J. Res. Develop., vol. 21, No. 1, pp. 10–20, Jan. 1977.

Rouse, Hunter; Elementary Mechanics of Fluids, John Wiley & Sons, Inc., New York, 1946, pp. 321–325.

Nikkei Electronics, (1978) "IBM Test-Manufactured Ink Jet Nozzle from Silicon Wafer", pp. 42–44 (with partial translation).

*Primary Examiner*—Joseph W. Hartary

*Attorney, Agent, or Firm*—Fitzpatrick, Cella, Harper & Scinto

[57] ABSTRACT

An ink-jet recording method includes projecting droplets of ink having a Weber number of no more than 500 toward a recording medium having thereon an ink receiving layer, thereby performing recording.

8 Claims, No Drawings

INK JET RECORDING METHOD IN WHICH THE PROJECTED INK DROPLETS HAVE A WEBER NUMBER OF NO MORE THAN 500

BACKGROUND OF THE INVENTION

1. Field of the Invention

This invention relates to an ink-jet recording method and, more particularly, to an ink-jet recording method for producing vivid recording images with improved resolution and contrast.

2. Description of the Prior Art

In general, ink-jet recording involves the projection of droplets of recording liquid, or "ink" using various techniques such as electrostatic attraction, utilizing pizoelectric elements to cause a mechanical displacement that projects a quantity of ink, and heating a quantity of ink to form a bubble, wherein the pressure created thereby is utilized to project a droplet of ink. The droplets of ink attach to a recording material such as paper, thus forming the desired recording. Ink-jet recording is worthy of attention because, among other things, it is capable of performing high-speed and multicolor printing without generating a great deal of noise.

A material comprising a liquid medium and a water-soluble dye, as the recording agent, is typically used as an ink for ink-jet recording.

Water-soluble dyes, preferably acid dyes or direct dyes, may be used as recording agents in consideration of such factors as safety, fade-resistance and general recording characteristics, and a liquid whose chief ingredient is water may be used as the liquid medium, also in view of safety considerations general recording characteristics. A polyhydric alcohol or the like may be added to the liquid medium for preventing blockage of the ink nozzles and for improving droplet ejection stability.

Materials such as ordinary kinds of paper or so-called ink-jet recording paper, having a base on which a porous ink receiving layer is formed, have been used as recording mediums for conventional ink-jet recording techniques. Recently, however, there is a widespread desire further to improve and extend the characteristics of such recording mediums, in view of improvements in the performance of recording apparatuses such as high-speed and multi-color ink-jet recording apparatus.

That is, if recording medium characteristics are to be improved, it is necessary for the ink to be rapidly absorbed by the recording medium so as to provide a dot that covers a given area and has the proper shape and border.

When color ink-jet recording is performed, it is necessary to use a recording medium which enables the dyestuffs which act as the recording agents to display high quality coloring properties and vividness, so as to achieve a high standard of chromaticity.

In addition, images formed by ink-jet recording are required to be highly stable, long lasting and water and light resistant.

Ink jet recording has been improved to some degree by providing a recording medium with a special ink receiving layer.

However, while recording mediums have been developed along these lines, it is now sought to perform image recording with vividness and resolution such as comparable to photographs.

In order to satisfy these requirements, it is necessary to put nearly perfectly round ink dots on the recording surface. To this end, attempts have been made to improve the recording surface of recording mediums used in accordance with the conventional recording methods. But while the amount of distortion in the ink dots on the recording surface can be reduced to some degree, it is not possible to heighten the vividness and resolution beyond a certain point no matter how much the recording surface is improved. Thus, images formed in accordance with the known methods are much inferior to photographic images in terms of vividness and resolution.

SUMMARY OF THE INVENTION

It is therefore an object of the present invention to provide an ink-jet recording method for forming recording images which display high resolution, vividness and high contrast comparable to those of photographs.

As a result of elaborate studies directed to finding measures for eliminating the above-described defects of the prior arts, it was concluded that the conventional approach of improving the recording surface of the recording medium alone is clearly insufficient and that additional improvement would be possible only both by preparing an ink receiving layer on the recording surface and by controlling the physical properties of the droplets of ink.

The present invention thus provides an ink-jet recording method for attaching droplets of ink to a recording medium, in which a recording medium having a separate ink receiving layer is provided and droplets of ink are projected toward the recording medium, wherein the Weber number of the droplets of ink, as represented by the following formula, is not more than 500:

$$We = \frac{\rho \cdot d \cdot v^2}{\gamma}.$$

where the density of the ink is represented by $\rho$ (g/cm$^3$); the diameter of a droplet of ink by d ($\mu$m); the ink droplet speed by $v$ (m/sec); and the surface tension of the ink by $\gamma$ (dyne/cm).

The present invention provides another ink-jet recording method for attaching droplets of ink whose colors are yellow, magenta, cyan and black, in which a recording medium having a separate ink receiving layer is provided and droplets of ink are projected toward the recording medium, wherein the Weber number of the droplets, as represented by the following formula, is not more than 500:

$$We = \frac{\rho \cdot d \cdot v^2}{\gamma}.$$

where the density of the ink is represented by $\rho$ (g/cm$^3$); the diameter of a droplet of ink by d ($\mu$m); the ink droplet speed by $v$ (m/sec); and the surface tension of the ink by $\gamma$ (dyne/om).

DETAILED DESCRIPTION OF THE PREFERRED EMBODIMENTS

Preferred embodiments of the present invention will now be described in detail. The first feature of an ink-jet recording method according to the present invention lies in the provision of a recording medium having an ink receiving layer. A second feature lies in the control and limitation of the Weber number (We) of the ink droplets to at most 500. The object of the present invention is achieved by these two aspects.

The recording medium used in accordance with the present invention is generally composed of a base, which provides a supporting body, and of an ink receiving layer, which provides a recording surface formed on the surface of the base. The ink receiving layer may be formed on the transparent or opaque base from known types of water-soluble or hydrophilic-nature polymers or filler materials.

Such polymers may be natural resins such as albumin, gelatin, casein, starch, cation starch, acacia gum and sodium alginate, or may be synthetic resins with their derivatives and modified types such as polyvinyl alcohol, polyacrylamide, polyvinyl pyrrolidone, quaternary polyvinyl pyrrolidone, polyethylene-imine, polyvinyl pyridylium halide, melamine resin, partial hydrolyzates of polyvinyl acetate, partially or completely saponified copolymers of polyvinyl acetate and other monomers, copolymers of vinyl ether such as polyvinyl ether and methyl vinyl ether, and other monomers, polymers of vinyl carboxylic acid such as acrylic acid polymer or copolymers of vinyl carboxylic acid and other polymers, water-soluble cellulose such as hydroxyethyl cellulose and carboxymethylcellulose, water-soluble polyurethane, polyamide or polyester. It is possible to adjust the ink-absorbing and water-resistant property of the ink receiving layer in accordance with the selection and combination of these water-soluble or hydrophilic-nature polymers when the layer is formed. For the purpose of reinforcing the ink receiving layer and/or improving adhesion of the layer and the base and changing the ink-absorbing and water-resistant property of the ink receiving layer, these polymers may be used as desired with a hydrophobic resin such as an SBR latex, an NBR latex, polyvinyl formal, polymethyl methacrylate, polyvinyl butyral, polyacrylonitrile, polyvinyl chloride, polyvinyl acetate, phenolic type resin and alkyd resin.

The filler material may, for example, comprise synthetic resin particles, silica, clay, talc, diatomaceous earth, calcium carbonate, calcium sulfate, barium sulfade, aluminum silicate, synthetic zeolite, alumina, zinc oxide, lithopone, satin white, titanium oxide, and magnesium oxide. It is possible to adjust the ink-absorbing and light-transmitting property of the ink receiving layer by using one or a combination of these materials.

The material constituting the base on which the ink receiving layer is formed from these water-soluble or hydrophilic-nature polymers or filler materials may be made of known types of transparent and opaque materials.

The transparent base material may be a film or a plate made of, for example, polyester resin, diacetate resin, triacetate resin, acrylic resin, polycarbonate resin, polyvinyl chloride resin, cellophane, or celluloid, or it may be a glass plate.

Such transparent materials may form the base on which a transparent ink receiving layer is provided, thereby giving a recording medium which is light-transmitting and applicable for use in observing images projected by an overhead projector or the like.

The linear transmittance (as defined below) of such a recording medium may preferably be at least 2% and more preferably more than 10%.

It is preferable to form the opaque base from materials such as paper, including general wood-free paper, coating base paper, coated paper and art paper, cloth, wood or metal plates, synthetic paper and the like. It is also possible to process the above-described transparent bases by known means to form an opaque base.

Such opaque bases may be used for a recording medium for observing surface images.

One suitable method for forming the ink receiving layer on a base surfaces may comprise preparing a coating liquid by dispersing or dissolving a single one of the above substances a mixture of the above water-soluble or hydrophilic-nature polymers or fillers in a suitable solvent; coating the base with this coating liquid by a known technique, such as a roll coating, rod bar coating, air knife coating or spray coating; and rapidly drying this coated base. Another suitable method comprises forming a layer from these materials by a known technique such as a heat extension method or T-die method, thus providing a self-supporting body. A base may then be laminated with this ink receiving layer sheet or the sheet may be coated with the above polymer materials by hot-melt coating to form another ink receiving layer on the sheet.

The depth of the ink receiving layer formed in the above-described manner can be altered as desired so long as it remains within a range wherein it is adequate for receiving the ink. This depends on the quantity of ink used in recording, and will generally not be less than 0.1 μm. It will preferably be from 0.5 to 30 μm for practical use.

The recording surface of the recording medium formed in this manner generally has a Bekk smoothness of 200 to 1,000 sec. based on JIS P8119. This standard specifies the manner of testing the smoothness of a sheet of paper or a paper board, as follows. A test piece is placed on a round specimen table having a glass surface and is pressurized through a rubber pushing plate overlaid thereon at a pressure of 1 kg/cm$^2$ {98 kPa}. In this state, the time (sec.) in which a volume of air of 10 ml passes through the space between one side of the test piece and the glass surface of the carrier is measured. The method according to the present invention utilizes a recording surface having a Bekk smoothness equal to or more than 30 sec., preferably 100 sec., or more preferably 500 sec.

If the Bekk smoothness is less than 30 sec., formation of the recorded images with sufficient definition and resolution is sometimes obstructed by the roughness of the recording surface, whatever the physical properties of the droplets of ink.

The smoothness of the recording surface of such a recording medium, namely, the surface of the ink receiving layer, varies in accordance with the kind of material employed as the base constituting the recording medium. When the surface on which the ink receiving layer is formed has a smoothness as high as those of the above-mentioned plastic films and sheets, the smoothness of the ink receiving surface of the obtained recording medium becomes about 500 to 1,000 sec. Such a recording medium is particularly suitable for the method according to the present invention.

On the other hand, when the base is formed of a material such as paper having a rough surface and liquid-absorptive properties, the Bekk smoothness of the ink receiving layer of the obtained recording medium is about 20 to 500 sec. Such a recording medium is not always suitable for use in accordance with the method of the present invention if droplets are applied without providing the surface with a suitable Bekk smoothness.

However, it is possible for the surface of a recording medium using such a paper base to have a Bekk smoothness equal to or more than 30 sec. if the surface of the base is smoothed and glossed by filling gaps thereof with fillers and/or if the surface of the ink receiving surface thereafter formed is smoothed by a press roll or the like.

Accordingly, the method of the present invention particularly suited to recording mediums that are transparent or glossy, or both, such as are described above, thus providing recorded images which are further improved in definition and resolution.

The water-color ink applied to the above-described recording medium by the ink-jet recording method of the present invention may be a known type.

Dyestuffs comprising water-soluble dyes represented by direct dyes, acid dyes, basic dyes, reactive dyes, food dyes and the like which are particularly suitable for this ink-jet recording method and which enable the images to satisfy required performance specifications in terms of color development, vividness, stability and light-resistance may preferably be, for example, direct dyes including:

C. I. direct black 17, 19, 32, 51, 71, 108, 146 and 154;
C. I. direct blue 6, 22, 25, 71, 86, 90, 106, and 199;
C. I. direct red 1, 4, 17, 28, 83;
C. I. direct yellow 12, 24, 26, 86, 98, and 142;
C. I. direct orange 34, 39, 44, 46 and 60;
C. I. direct violet 47 and 48;
C. I. direct brown 109;
C. I. direct green 59, etc.,
acid dyes including:
C. I. acid black 2, 7, 24, 26, 31, 52, 63, 112 and 118;
C. I. acid blue 9, 22, 40, 59, 93, 102, 104, 113, 117, 120, 167, 229 and 234;
C. I. acid red 1, 6, 32, 37, 51, 52, 80, 85, 87, 92, 94, 115, 180, 256, 317 and 315;
C. I. acid yellow 11, 17, 23, 25, 29, 42, 61 and 71;
C. I. acid orange 7 and 19;
C. I. acid violet 49, etc., and
other applicable dyes may be:
C. I. basic blue 1, 3, 5, 7, 9, 24, 25, 26, 28 and 29;
C. I. basic red 1, 2, 9, 12, 13, 14 and 37;
C. I. basic violet 7, 14 and 27;
C. I. food black 1 and 2, etc.

These examples of dyestuffs are particularly suitable for the ink-jet recording method of the present invention, but the dyestuffs to be used in accordance with the present invention are not limited to those listed above.

Conventional ink contains 0.1 to 20% ingredients of such water-soluble dyes by weight. The ink used in accordance with the present invention may contain dyestuffs at the same ratio.

The solvent for the ink used in accordance with the present invention may be water or water mixed with a water-soluble organic solvent and is preferably a solvent containing a polyhydric alcohol organic solvent as a water-soluble organic solvent for preventing desiccation of the ink.

It is preferable to use demineralized water instead of ordinary water which contains various ions.

The water-soluble organic solvent may be, for example, alkyl alcohols having 1 to 8 carbon atoms such as methyl alcohl, ethyl alcohol, n-propyl alcohol, isopropyl alcohol, n-butyl alcohol, sec-butyl alcohol, tert-butyl alcohol and isobutyl alcohol; amides such as dimethylformamide, dimethylacetamide; ketones or ketoalcohols such as acetone diacetone alcohol; ethers such as dioxane; polyalkylene glycols such as polyethylene glycol and polypropylene glycol; alkylene glycols whose alkylene group has 2 to 6 carbon atoms such as ethylene glycol, propylene glycol, butylene glycol, triethylene glycol, 1, 2, 6-hexanetriol, thiodiglycol, hexylene glycol and diethylene glycol; glycerine; lower alcohols of polyvalent alcohols such as ethylene glycol methyl (or ethyl) ether, diethylene glycol methyl (or ethyl) ether, triethylene glycol monomethyl (or monoethyl) ether; or N-methyl-2-pyrrolidone, 1, 3-dimethyl-2-imidazolidinone.

Among these water-soluble organic solvents, polyvalent alcohol organic solvents such as diethylene glycol, lower alcohols of polyvalent alcohol organic solvents such as triethylene glycol monomethyl (or monoethyl) ether are preferable.

If necessary, the ink used in accordance with the present invention may contain various additives such as surfactants, viscosity modifiers and surface tension modifiers, in addition to the above ingredients.

The ink used in the method of the present invention is prepared as above. Generally, the density ($\rho$) of the ink is ohosen to be between 0.9 and 1.2 g/cm$^3$ and the surface tension ($\gamma$) is chosen to be between 15 and 65 dyne/cm by varying the above composition of the ink and including the above additives in the ink, as required.

Any technique for applying the above-described ink droplets to the above-described recording medium is applicable to the ink-jet recording method according to the present invention, so long as it is capable of effectively projecting ink droplets from a nozzle and it can attach the droplets to the target recording medium. Typical such techniques involve, for example, those described in IEEE Transactions on Industry Applications Vol. JA-13, No. 1 (February and March issues, 1977), Nikkei Electronics. These are suitable for use in the method according to the present invention. One such technique uses electrostatic attraction whereby the ink is changed into droplets that are successively extracted from the nozzle by applying a strong electric field between the nozzle and an accelerating electrode located in front of the nozzle and spaced therefrom by several millimeters, and the ink droplets are deflected by information signals applied to deflecting electrodes as they pass between the deflecting electrodes, thus performing the recording. This technique may be modified so that ink droplets are extracted in accordance with information signals without deflecting the ink droplets. Both techniques are suitable for the method according to the present invention.

According to another technique, a small pump applies a high pressure to the ink and a quartz-crystal vibrator or the like mechanically vibrates the nozzle, thereby forcibly ejecting minute ink droplets. The ink droplets charged in accordance with information signals as when they are projected. The charged droplets are deflected in accordance with the amount of charge as they travel between deflecting electrode plates. Still another technique is known as microdot ink-jet recording. According to this technique, the pressure of the ink and the state of excitation are maintained at suitable values within a certain range so as to generate larger and smaller ink droplets, only the smaller ink droplets being utilized for recording. This technique enables the nozzle to form groups of minute ink droplets even when the size of the nozzle aperture is as large as conventional types.

Still another technique utilizes a piezoelectric element instead of mechanical means such as a pump, as is employed by other techniques. According to this technique, displacement of the piezoelectric element is caused by applying an electrical signal to the element, and the ink is thereby pressurized and a droplet is projected from the nozzle.

The ink-jet recording technique disclosed in Japanese Patent Unexamined Publication No. 59936 / 1979 may also be used. According to this technique, the volume of the ink is abruptly changed when affected by heat energy, which creates a bubble, whereby ink droplets are projected.

The diameter (d) of ink droplets which can be formed by these conventional ink-jet recording apparatuses is 10 to 150 μm, and the velocity ($\nu$) of the ink droplets is 1 to 30 m/sec, though they vary to some extent depending on the nozzle diameter, the voltage applied and the physical properties of the ink.

When the values of the density ($\rho$), the surface tension ($\gamma$), the diameter (d) and the flying velocity ($\nu$) of a droplet of ink are independently changed within the above ranges, the Weber number (We) represented by the formula above may vary between 0.138 and 10,800.

According to the present invention, it is possible to form images having a quality compatible with that of silver salt photographs by using an arrangement in which the recording medium employed has an ink receiving layer and the values of the density ($\rho$), the surface tension ($\gamma$), the diameter (d) and the velocity ($\nu$) of an ink droplet are controlled such that the Weber number (We) is not more than 500.

After detailed study, it has been possible to perform good recording by providing the recording medium with an ink receiving layer whose recording surface has a Bekk smoothness of equal to or more than 30 sec. based on JIS P 8119, and by setting the Weber number (We) of the ink droplets to not more than 500.

When the smoothness of the recording surface of the recording medium is less than 30 sec., an ink dot which is formed on the recording surface is not a substantially round circle because of the unevenness of the surface, thus sometimes resulting in an unsatisfactory image.

Even when the Bekk smoothness of the recording surface of the recording medium is not less than 30 sec., the shape of the ink dot formed on the recording surface is so deformed as to be far from a perfectly round circle and sometimes the droplet even splashes and spatters ink on the recording medium, if the physical properties of the ink and of the droplets deviate from the above ranges, that is, if the Weber number (We) is more than 500. For example, when the Weber number (We) is more than 1,000, a droplet of ink impacts the recording surface and is broken and scattered, thus causing splashing. Furthermore, when the Weber number (We) is more than 500 and approaches to 1,000, an ink droplets "vibrates" when it hits the recording surface and the shape of the resulting dot is thereby deformed. In these cases, the images are unsatisfactory in terms of vividness and resolution. It is preferable to set the Weber number to be not more than 300, more preferably to be above 20 and under 300.

The method according to the present invention uses a recording medium whose recording surface has a Bekk smoothness of more than 500 sec. and it controls the density ($\rho$) and the surface tension ($\gamma$) of the ink applied, and the diameter (d) and the flying velocity ($\nu$) of an ejected droplets of ink on the basis of the formula (1) such that the Weber number is not more than 500. The resulting ink dot is thereby evenly spread so as to form a substantially round circle without the irregularity which is permitted by the conventional methods. The method according to the present invention thus enables images to be formed with a high degree of vividness and resolution.

For a more complete understanding, working examples of the present invention are described below. The terms "part" and "%" in the following description are defined by weight, if not specified otherwise.

EXAMPLE 1

A sheet of art paper (OK Art Post (trade mark) made by Oji Paper) was used as the base on which the following composition was coated by a bar coater method such as to form an ink receiving layer having a thickness of 3 μm when dry. It was then dried at 80° C. for 10 minutes, thus forming a recording medium. The Bekk smoothness of this recording medium was 800 sec., and the gloss was 45% (as defined below).

Coating Composition

| | |
|---|---|
| Polyvinyl alcohol (PVA-S33, made by KURARAY) | 5 parts |
| Polyvinyl Pyrrolidone (PVP K-90, made by KURARAY) | 5 parts |
| Water | 90 parts |

Recording was performed according to the present invention with the Weber number of the droplets being about 58 ($\rho$=1.0 g/cm$^3$, d=0.008 cm, $\nu$=600 cm/sec, $\gamma$=50 dyne/cm), whereby a quantity of ink having the following composition was applied to this Recording Medium 1 by employing a recording apparatus using an on-demand type ink-jet recording head adapted for ejecting ink by means of a piezoelectric element (ejecting orifice diameter: 60 μm, piezoelectric vibrator driving voltage: 60 V, frequency: 2 kH).

Ink Composition

| | |
|---|---|
| C.I. direct black 154 | 5 parts |
| Triethylene glycol | 5 parts |
| Glycerin | 15 parts |
| Water | 75 parts |
| Dodecyl benzene sodium sulfonate (added such as to make the surface tension 50 dyne/cm) | |

EXAMPLES 2 to 5, REFERENCE EXAMPLES 1 to 3

Recording Mediums 2 to 4 and the following ink-jet Recording Conditions 2 to 4 were used instead of the Recording Medium 1 and the ink-jet Recording Condition 1 used in Example 1, thus providing various ink-jet recording samples, other factors were the same as in Example 1.

(Recording Medium 2)

A PET film (thickness: 100 μm, Lumirror #100T, made by TORAY INDUSTRIES) was used as the base on which the composition below was coated by a bar coater method so as to form an ink receiving layer having a thickness of 5 μm. It was dried at 100° C. for 5 minutes. The Bekk smoothness of the Recording Medium 2 thereby obtained was more than 1,000 sec., and the linear transmittance thereof was 80%.

Coating Composition

| | |
|---|---|
| Hydroxyethyl cellulose (HEC AH-15, made by Fuji Chemical) | 5 parts |
| Water | 95 parts |

(Recording Medium 3)

A sheet of market wood-free paper (Ginkan (trademark) made by Sanyo-Kokusaku Pulp) was used as a the recording medium. The Bekk smoothness of this Recording Medium 3 was 55 sec. Recording Medium 3 had no separate ink receiving layer.

(Recording Medium 4)

A sheet of general wood-free paper (basis weight: 68 $g/m^2$) was used as the base on which the composition below was coated by a bar coater method at a dry coat weight of 15 $g/m^2$ and was dried at 100° C. for 5 minutes. The Bekk smoothness of this recording medium was 200 sec.

Coating Composition

| | |
|---|---|
| Silica (Siloid 404 made by Fuji-Davisson Chemical, average particle diameter: 10 μm) | 100 g |
| Polyvinyl alcohol | 25 g |
| NBR latex | 5 g |
| Water | 500 g |

(Recording Condition 2)

The ink surface tension was adjusted to 40 dyne/cm, and the piezoelectric vibrator driving voltage is was to be 100 V, thus performing a recording with a Weber number of about 490 ($\rho$=1.0 g/cm$^3$, d=0.01 cm, $\nu$=1.400 cm/sec, $\gamma$=40 dyne/cm).

(Recording Condition 3)

The ink surface tension was adjusted to 35 dyne/cm, and the piezoelectric vibrator driving voltage was set to be 100 V, thus performing recording with a Weber number of about 640 ($\rho$=1.0 g/cm$^3$, d=0.01 cm, $\nu$=1.500 cm/sec, $\gamma$=35 dyne/cm).

(Recording Condition 4)

The ink surface tension was adjusted to 45 dyne/cm, and the piezoelectric vibrator driving voltage was set to be 80 V, thus performing recording with a Weber number of about 240 ($\rho$=1.0 g/cm$^3$, d=0.009 cm, $\nu$=1.100 cm/sec, $\gamma$=45 dyne/cm).

Combinations of the recording mediums and the recording conditions with respect to Examples 1 to 5 and reference examples 1 to 3 are shown below in table form.

| | Recording Medium 1 | Recording Medium 2 | Recording Medium 3 | Recording Medium 4 |
|---|---|---|---|---|
| Recording Condition 1 | Example 1 | Example 2 | Reference Example 3 | — |
| Recording Condition 2 | Example 3 | Example 4 | — | — |
| Recording Condition 3 | Reference Example 1 | Reference Example 2 | — | — |
| Recording Condition 4 | — | — | — | Example 5 |

The evaluations of the recordings performed by Examples 1 to 5 and Reference Examples 1 to 3 are shown below in Table 1.

The evaluation for each entry in Table 1 was performed in the following manner.

(1) The dot density was measured using a Sakura Microdensitometer PDM-5 (made by Konishiroku Photo Industry) on the basis of JIS K 7605 applied to the printed dot. This standard specifies the manner of measuring the density of a developed negative whereby the sensitivity of a sensitized material forming this negative is measured. The density is determined by the following equation:

$$Density = \log_{10}(F_o/F)$$

where F represents a beam (transmitted beam) which is one of the beams (lighting beams) emitted onto the experimental point of the material and which is transmitted through the experimental point and introduced into a light receiving device, and $F_o$ represents a transmitted beam formed when the material is removed from the same measuring system.

(2) The dot diameter was obtained from the area Sd of the printing dot using the following equation:

$$[Dot\ diameter] = 2\cdot(Sd/\pi)^{\frac{1}{2}}.$$

(3) The dot shape was defined by the ratio of the perimeter the circle line $l_1$ of a circle having the diameter determined in (2) and the actual perimeter of the dot $l_2$ ($l_2/l_1$) When this ratio is 1, the dot is perfectly round and has the ideal shape.

(4) Glossiness was measured with respect to the 60° mirror surface gloss on the basis of JIS Z-8741. According to this standard, the value of glossiness represents, in relation to the incident angle $\theta$, the ratio of a specular reflection beam $\phi_s$, which is reflected on the surface of a the sample, to a specular reflection beam $\phi_{os}$ which is reflected on the glass surface with a refractive index of 1.567 under the same condition. In the present invention, it is measured at $\theta$=60°.

(5) The linear transmittance was measured as follows. A beam of rectilinear light perpendicularly introduced into a sample so as to pass therethrough, travels first through a slit located on the optical path of the beam and spaced from the sample by 9 cm, then through the sample, and finally enters a detector to be measured by using a 323 type Hitachi automatic spectrophotometer (made by Hitachi) or the equivalent. From the value of spectral transmittance thereby measured, the Y value in tristimulus values of color is determined. Then, the linear transmittance T is obtained from the following equation:

$$T = Y/Y_o \times 100,$$

where

Y; the Y value of the sample, and $Y_o$; the Y value of the blank, that is the Y value with no sample present.

For the present invention, the linear transmittance is defined in relation to rectilinear light, and is different from an evaluation of transparency, which measures diffused light and obtains diffuse transmittance (by placing an integrating sphere to the rear of a sample such as to obtain a transmittance value including diffused light), and of opacity, obtained from a ratio with respect to black and white linings applied to the reverse side of a sample).

(6) Sensory evaluation

Sensory evaluation was carried out with a panel of thirty members (twelve men and eighteen women). Examples 1 to 5 and Reference Examples 1 and 3 were evaluated under white light of 1000 lux and at the distance of most distinctive vision (30 cm). Examples 2 and 4 and Reference Example 2 were evaluated at a position 5 m away while images were projected on a screen at a distance of 3 m by an overhead projector.

The images used in the evaluation were various figures involving the alphabet and numerals.

The sensory evaluation value was the sum of the thirty responses given by the panel to the question "Is this image excellent in definition?" with 5 points being awarded for "excellent", 4 points for "quite good", 3 points for "medium", 2 points for "rather inferior" and 1 point for "inferior".

According to the present invention, the physical properties, namely, the density (g/cm$^3$) of the ink, the diameter (μm) of the ink droplet, the velocity of the ink droplet (m/sec) and the surface tension (dyne/cm) of the ink were measured as described below.

The density of the ink was measured at 20° C. by using a hydrometer.

The surface tension of the ink was measured at 20° C. by using a surface tension balance (made by Kyowa Kagaku).

The diameter and the velocity of the ink droplet were measured as follows.

The time in which the leading edge of an ink droplet reached a point spaced by 1.0 mm from the orifice surface of the recording head was measured by applying a measuring strobe signal, when t seconds had passed after a signal was applied to the recording head.

The diameter of the ink droplet was measured at its maximum width perpendicular to the projecting direction in the above measuring conditions.

TABLE 1

| | Examples | | | | | Reference Examples | | |
|---|---|---|---|---|---|---|---|---|
| | 1 | 2 | 3 | 4 | 5 | | 1 | 3 |
| Dot density | 1.0 | 1.0 | 1.0 | 1.0 | 1.0 | 1.0 | 1.0 | 1.0 |
| Dot diameter | 170 μm | 240 μm | 220 μm | 310 μm | 250 μm | 230 μm | 340 μm | 210 μm |
| Dot shape | 1.12 | 1.16 | 1.14 | 1.08 | 1.04 | 1.62 | 1.43 | 1.80 |
| Gloss | 45% | — | 45% | — | — | 45% | — | — |
| Linear transmittance | — | 80% | — | 80% | — | — | 80% | — |
| Bekk smoothness | 800 sec. | more than 1,000 sec. | 800 sec. | more than 1,000 sec. | 200 sec. | 800 sec. | more than 1,000 sec. | 55 sec. |
| Sensory evaluation | 127 | 142 | 121 | 134 | 137 | 52 | 81 | 39 |

EXAMPLE 6

The following four kinds of colored ink were applied to the recording medium used in Example 5, the surface tension of each being adjusted to 45 dyne/cm. Recording was performed under the same conditions as those in Example 5.

Ink composition

| | |
|---|---|
| Yellow ink | |
| C.I. direct yellow 24 | 5 parts |
| Triethylene glycol | 5 parts |
| Glycerin | |

-continued

| | |
|---|---|
| Water | 75 parts |
| Dodecyl benzene sodium sulfonate (added such as to make the surface tension 45 dyne/cm) | |
| Magenta ink | |
| C.I. acid red 6 | 5 parts |
| Triethylene glycol | 5 parts |
| Glycerin | 15 parts |
| Water | 75 parts |
| Dodecyl benzene sodium sulfonate (added such as to make the surface tension 45 dyne/cm) | |
| Cyan ink | |
| C.I. direct blue 86 | 5 parts |
| Triethylene glycol | 5 parts |
| Glycerin | 15 parts |
| Water | 75 parts |
| Dodecyl benzene sodium sulfonate (added such as to make the surface tension 45 dyne/cm) | |
| Black ink | |
| C.I. direct black 19 | 5 parts |
| Triethylene glycol | 5 parts |
| Glycerin | 15 parts |
| Water | 75 parts |
| Dodecyl benzene sodium sulfonate (added such as to make the surface tension 45 dyne/cm) | |

Ink dots substantially perfectly round were formed on the recording surface, and a plurality of ink droplets could be attached to one point on the recording surface without flowing therefrom, thus obtaining recorded images improved in definition, vividness and chromaticity.

What is claimed is:

1. An on-demand ink-jet recording method comprising the steps of:

providing a recording medium which comprises a substrate and an ink receiving layer provided on the substrate, wherein the surface of the ink receiving layer has a Bekk smoothness of at least 100 sec. based on JIS P 8119; and projecting droplets of ink toward the ink receiving layer of the recording medium so as to form substantially circular dots thereon, wherein the Weber number (We) of the ink droplets, as represented by the following equation, is not more than 500:

$$We = \frac{\rho \cdot d \cdot v^2}{\gamma}$$

where $\rho$ represents the density of the ink (g/cm$^3$); d represents the diameter of the ink droplets (μm); $v$ represents the velocity of the ink droplets (m/sec); and $\gamma$ represents the surface tension of the ink (dyne/cm).

2. An ink-jet recording method according to claim 1, wherein the Bekk smoothness of the surface of the recording medium is more than 500 sec. based on JIS P 8119.

3. An ink-jet recording method according to claim 1, wherein said recording medium is transparent.

4. An ink-jet recording method according to claim 1, wherein said recording medium glossy.

5. An on-demand ink-jet recording method comprising the steps of:

providing a recording medium having an ink-receiving layer on a substrate, wherein the surface of the ink receiving layer has Bekk smoothness of at least 100 sec. based on JIS P 8119; and projecting droplets of yellow, magenta, cyan and/or black ink toward the ink receiving layer of the recording medium so as to form substantially circular dots thereon, wherein the Weber number (We) of the ink droplets, as represented by the following formula, is not more than 500:

$$We = \frac{\rho \cdot d \cdot v^2}{\gamma}$$

where $\rho$ represents the density of the ink ($g/cm^3$); d represents the diameter of the ink droplets ($\mu m$); $\nu$ represents the velocity of the ink droplets (m/sec); and $\gamma$ represents the surface tension of the ink (dyne/cm).

6. An ink-jet recording method according to claim 5, wherein the Bekk smoothness of the surface of said recording medium is more than 500 sec. based on JIS P 8119.

7. An ink-jet recording method according to claim 5, wherein the recording medium is transparent.

8. An ink-jet recording method according to claim 5, wherein the recording medium is glossy.

* * * * *